Dec. 13, 1960  I. M. DAVIDSON  2,964,267
AIRCRAFT ENGINE FUEL SYSTEMS
Filed Sept. 12, 1956  4 Sheets-Sheet 1

Dec. 13, 1960     I. M. DAVIDSON     2,964,267
AIRCRAFT ENGINE FUEL SYSTEMS

Filed Sept. 12, 1956     4 Sheets-Sheet 2

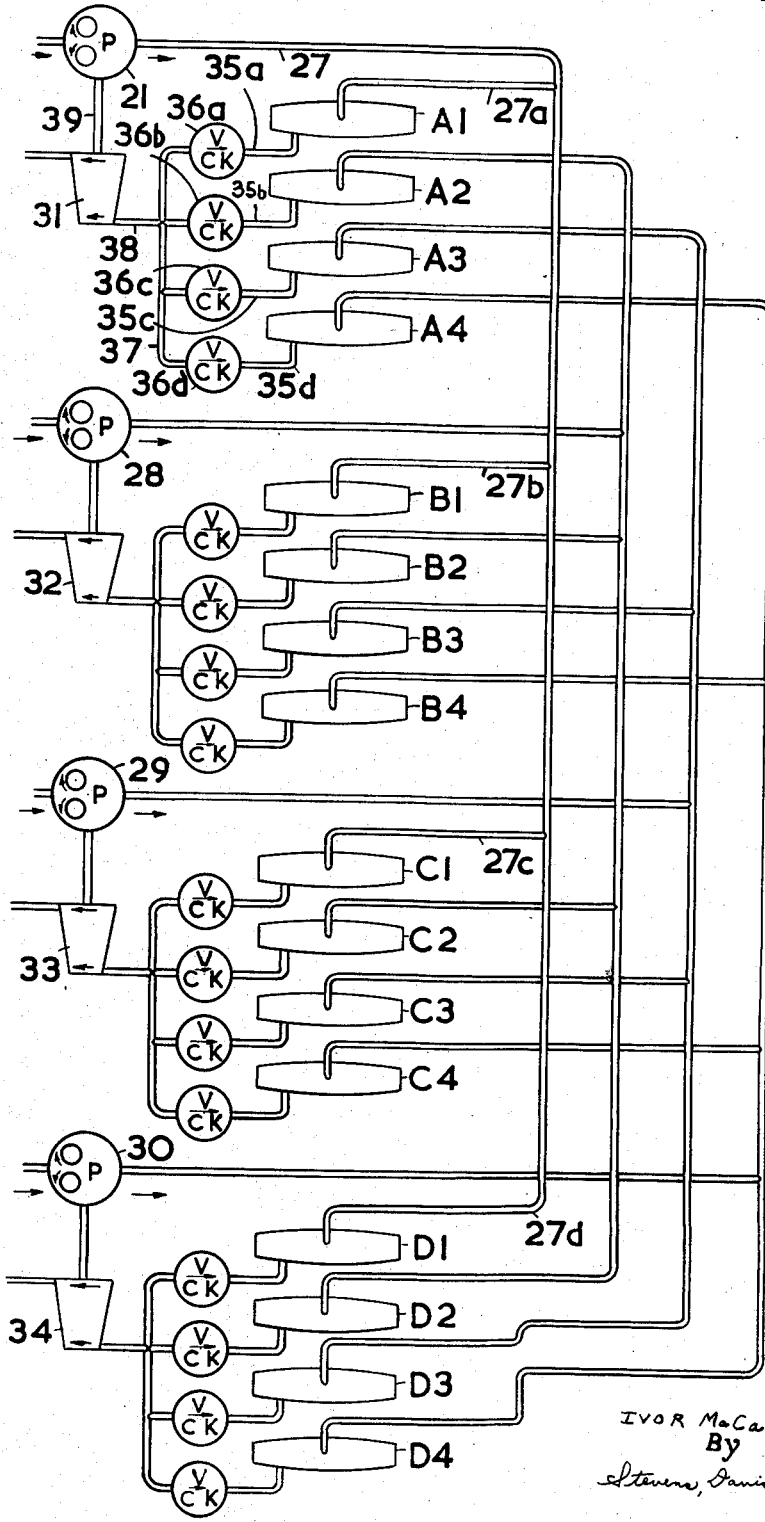

United States Patent Office 2,964,267
Patented Dec. 13, 1960

2,964,267

AIRCRAFT ENGINE FUEL SYSTEMS

Ivor Macaulay Davidson, Farnborough, England, assignor to Power Jets (Research and Development) Limited, London, England, a British company Filed Sept. 12, 1956, Ser. No. 609,433

Claims priority, application Great Britain Sept. 28, 1955

13 Claims. (Cl. 244—15)

This invention relates to engine fuel systems for aircraft powered by a plurality of groups of engines with their lines of action spaced from one another.

The invention is thought to have particular though not exclusive application to "jet flap" aircraft as described in copending United States patent application Serial No. 543,212, filed October 27, 1955 in the names of the present applicant and B. S. Stratford. Said applications disclose an aircraft having a number of jet propulsion engines mounted in the wings and discharging propulsive jet streams rearwardly through jet nozzles which are distributed spanwise along the wings and are such that the jet streams leave the rear of the wing as a long shallow spanwise extending sheet. This sheet can be deflected downwardly and constitutes a "jet flap" which interacts with the main stream flow over the wing in such a way that the aerodynamic lift on the wings is greatly increased.

To obtain the full advantage of the "jet flap," it is desirable that the jet sheet shall extend continuously along a major part of the wing span, and preferably as nearly as possible from wing tip to root consistent with structural requirements. If any one of the engines should fail there will tend to be a discontinuity in the jet sheet with a resultant serious reduction in lift, and further the resulting asymmetry in the thrust distribution along the wing span may give rise to difficulty.

Asymmetrical thrust difficulties may also arise in aircraft of types other than that described in said copending applications, e.g. in aircraft with conventional turbojet engines or engine-driven propellers with their lines of action spaced along the wing span, or with batteries of lifting engines with their lines of action spaced either spanwise or in a fore and aft direction.

The invention accordingly provides an engine fuel system for an aircraft powered by a plurality of groups of engines with their lines of action spaced from one another comprising a plurality of fuel pumps, one driven in common by the engines of each group and connected to supply fuel to at least one engine of each group.

In such an arrangement, if one fuel pump should fail, the engines which come to a standstill are distributed along the wing span so that asymmetrical thrust effects are minimised.

Each pump may be driven from its corresponding group of engines through a mechanical transmission, the transmission from each engine to the pump incorporating a free-wheel device. Other forms of drive may however be used. Thus the pump may be driven by a turbine which is itself driven by air or gasses bled off from all the engines of the group and supplied to the turbine through a non-return valve. In either case the arrangement is such that any one engine can come to rest without affecting the operation of the remainder of the group.

The number of engines in each group may be equal to the number of groups, or greater than the number of groups. In the latter case, at least some of the fuel pumps may be connected to supply fuel to more than one engine of each group.

The groups of engines may be arranged with their lines of action distributed spanwise of the aircraft wing. The engines may be jet propulsion engines connected to discharge propulsive jet streams through rearwardly directed jet nozzles distributed along the wing span and so shaped and arranged that the streams are discharged rearwardly as a long thin jet sheet extending continuously spanwise of the wing as in said copending applications.

The engines of each group may be partly or wholly structurally integrated with one another.

The invention will now be more fully described by way of example with reference to the accompanying diagrammatic drawings, of which:

Figure 6 shows schematically an alternative engine fuel system.

Figure 1:
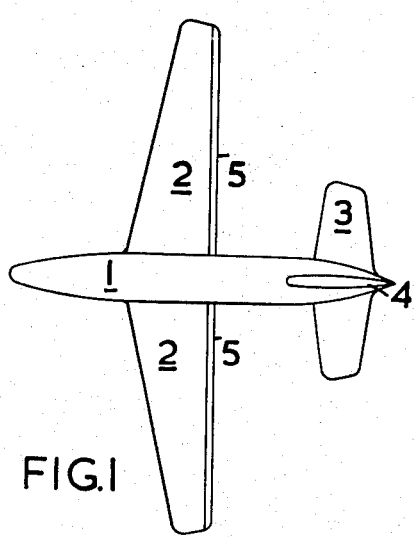
Figure 1 is a plan view of an aircraft.
Figure 2:
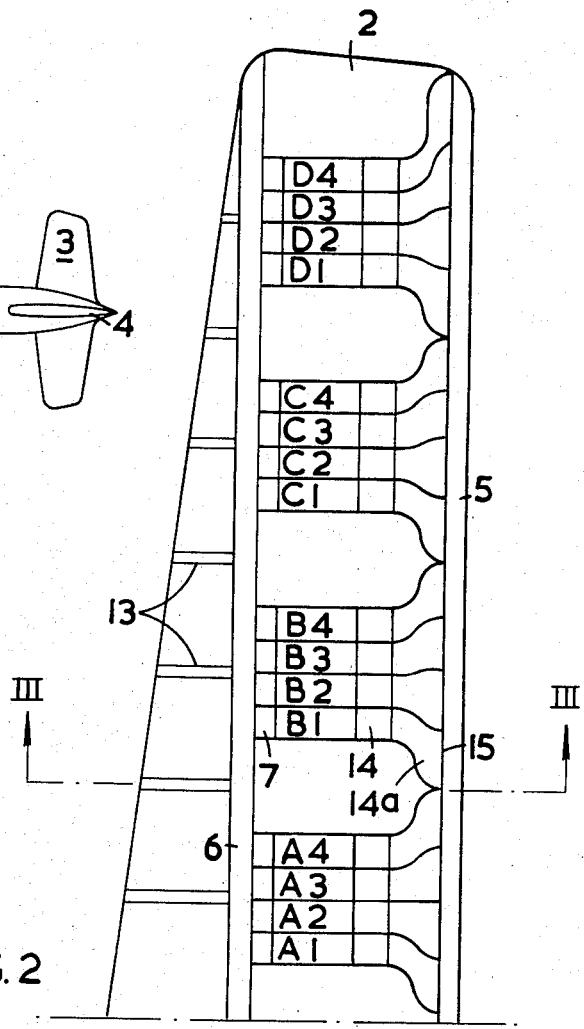
Figure 2 is a plan view of one wing of the aircraft of Figure 1 the wing upper surface being shown as removed to show the interior construction.

In Figure 1, the aircraft has a fuselage 1, wings 2 extending on each side thereof, a tailplane 3, and a fin and rudder 4. At the trailing edge of each wing there is a trailing edge wing flap 5. The aircraft is powered by thirty two gas turbine jet propulsion engines, sixteen being mounted in each wing in four groups of four, i.e., $A_1$, $A_2$, $A_3$, $A_4$; $B_1$, $B_2$, $B_3$, $B_4$; $C_1$, $C_2$, $C_3$, $C_4$; $D_1$, $D_2$, $D_3$, $D_4$ as shown in Figure 2, their lines of thrust being parallel and spaced apart from one another along the wing span. The four engines of each group are arranged close together and side by side and may be partly or wholly structurally integrated with one another, e.g. the compressor and/or turbine stators of all four engines may be constituted by parts of a single casting or group of castings, and they are supported in the aircraft on a common mounting. Thus each group of engines may be thought of and designed as a single "4-cylinder" engine.

Figure 3:
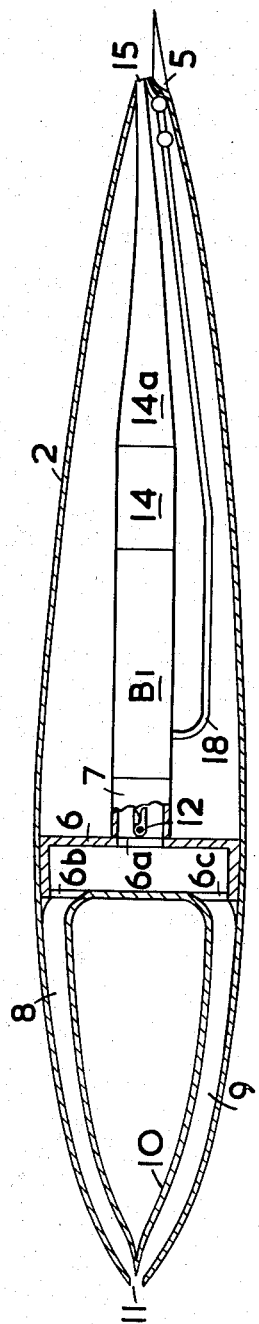
Figure 3 is a fore and aft section through the wing, taken on the line III—III in Figure 2.

The structure of each wing 2 includes a hollow box-like main spar 6 extending spanwise for substantially the full span of the wing. Each engine has its compressor inlet connected to the interior of the spar through a short duct, such as the duct 7 in Figure 3 which registers with an aperture $6a$ in the rear wall of the spar. The interior of the spar is connected through apertures $6b$, $6c$, in its front wall and air passages 8 and 9 formed between a fairing 10 and the upper and lower surfaces of the wing 2 to a long shallow air inlet slot 11 extending along the leading edge of the wing as nearly as possible from wing tip to root, i.e. extending as close to the wing tip and the fuselage as possible consistent with structural requirements. Thus, as in copending United States patent application Serial No. 484,658, filed January 28, 1955 in the names of the present applicant and N. A. Dimmock, each engine is in common connection with the whole length of the inlet slot through the interior of the spar 6 which constitutes a common manifold. There is a non-return valve 12 consisting of a pair of spring-loaded flaps in each of the ducts 7 leading to the engine intakes, as in said copending application.

As shown in Figure 2, the wing structure further includes ribs or stiffeners 13 which extend from spar 6 to the wing leading edge, and such other structural members (not shown) as are normally required in aircraft wings.

Each engine discharges its exhaust gas stream through a jet pipe, such as the jet pipe 14 in Figure 2 which has a rearward portion 14a which progressively changes in cross-section from circular to terminate in a rearwardly directed shallow elongated spanwise extending jet nozzle 15 towards the rear of the wing. The jet nozzles of all the engines are contiguous at their ends and together form a nozzle aperture extending continuously spanwise of the wing. The individual nozzles 15 are of substantially the same size but the depth of the nozzle aperture decreases along the wing span towards the tip in proportion to the local wing chord so that the length of the nozzles increases towards the wing tip. The centre line of each group of engines except the inboard group is slightly offset in an inboard sense with respect to the centre line of the corresponding group of nozzles to allow for the reduced wing thickness towards the tip.

The chord of the flap 5 also decreases towards the wing tip in proportion to the local wing chord. The flap chord is quite small, being not more than 10%, and preferably from 2 to 5%, of the total local wing chord.

The wing 2 is further formed with a long shallow rearwardly directed nozzle 16 (see Figure 4) extending continuously spanwise of the wing as nearly as possible from root to tip under the jet nozzles 15. This nozzle is connected to a common manifold 17 extending spanwise along the wing, which manifold is supplied with air bled off from the compressor of each engine through pipes 18 incorporating non-return valves 19. The nozzle 16 may alternatively be supplied with air from one or more auxiliary compressors.

Figure 4:
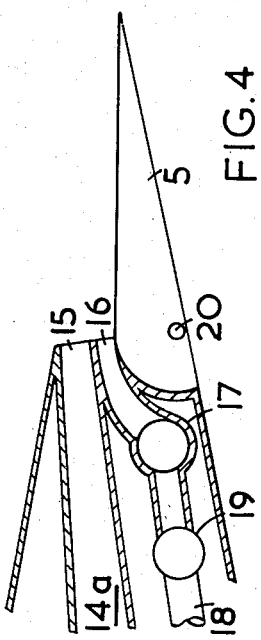
Figure 4 is an enlarged section through the trailing edge of the wing.

The jet nozzles 15 are so arranged that the propulsive jet streams from the engines are discharged rearwardly over the flap 5 as a long thin jet sheet extending continuously along the wing as nearly as possible from wing tip to root. The nozzle 16 discharges air in a quantity which is small in comparison to the jet sheet as a layer between the jet sheet and the upper surface of the flap 5. As shown in Figure 4 the nozzles 15, 16 are directed to discharge upwardly at a small angle, say, 10 or 15% to the horizontal, but when the flap is in the datum position shown, with its upper surface horizontal, it induces the jet sheet and the layer of air to follow a path along its upper surface (due to Coanda effect) so that they are discharged in a rearward direction. The flap is mounted for pivotal movement about an axis 20 by means of an operating device of known type, e.g. a hydraulic jack. The flap can be turned downwardly in which case the jet sheet and layer of air are induced to follow its upper surface so that they are discharged in a downwardly inclined direction. The jet sheet then acts as a "jet flap" which interacts with the main stream flow over the wing in such a way that the aerodynamic pressure distribution around the wing is modified and the lift thereon substantially increased as described in said copending cognate applications. The flap 5 can also be turned to deflect the jet sheet upwardly. The flaps 5 in opposite wings of the aircraft can be operated to deflect the jet sheets upwardly and downwardly either together or differentially by a control system such as that described in copending United States patent application Serial No. 609,450, filed September 12, 1956 in the name of the present applicant.

Preferably the nozzles 15, the further nozzle 16, the flap 5 and the jet sheet extend as nearly as is practicable from wing tip to root in each wing as described above. However, structural requirements may make it necessary to restrict their spanwise extent to as little as, but not substantially less than, two-thirds of the full span. In any case, they extend along a major part, i.e. more than 50%, of the span.

Figure 5:
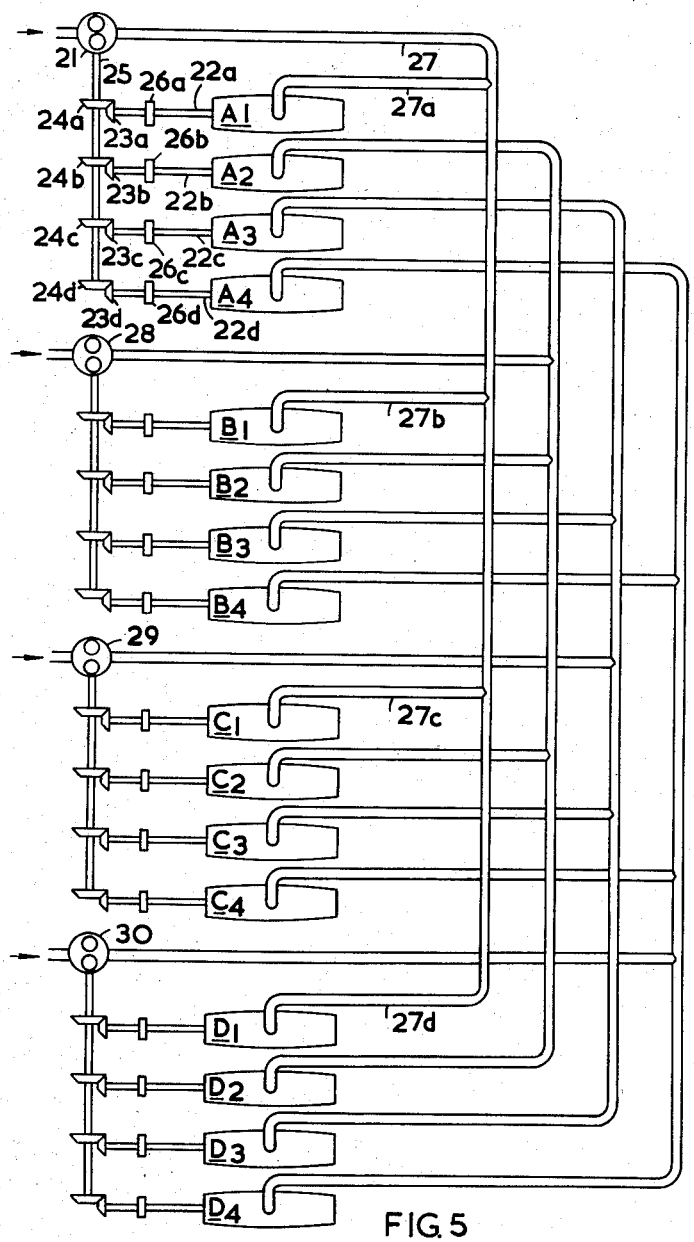
Figure 5 shows schematically the engine fuel system.

Referring now to Figure 5 the inboard group of engines $A_1$, $A_2$, $A_3$ and $A_4$ in each wing drive a common fuel pump 21 through shafts 22a, 22b, 22c, 22d carrying bevel gears 23a, 23b, 23c, 23d meshing with bevel gears 24a, 24b, 24c, 24d, mounted on a common drive shaft 25 for the pump 21. Each shaft 22a, etc., includes a free wheel device 26a, 26b, 26c, 26d. The pump 21 is connected to supply fuel through pipes 27, 27a, 27b, 27c, 27d to one engine of each of the four groups, i.e. the engines $A_1$, $B_1$, $C_1$, $D_1$.

Similarly the engines $B_1$, $B_2$, $B_3$, $B_4$ of the second group drive a common fuel pump 28 which supplies fuel to the engines $A_2$, $B_2$, $C_2$, $D_2$, the engines $C_1$, $C_2$, $C_3$, $C_4$ of the third group drive a common fuel pump 29 which supplies fuel to the engines $A_3$, $B_3$, $C_3$, $D_3$ and the engines $D_1$, $D_2$, $D_3$, $D_4$ of the outboard group drive a common fuel pump 30 which supplies fuel to engines $A_4$, $B_4$, $C_4$, $D_4$.

It will be seen that if one fuel pump, e.g. pump 21, fails, the four engines $A_1$, $B_1$, $C_1$, $D_1$ which consequently cease operation are distributed singly along the wing span, and asymmetrical thrust effects are minimised. The jet nozzles corresponding to these four engines each occupy only about one sixteenth of the wing span and the jet streams emitted from the jet nozzles on each side thereof are in effect able to spread laterally towards one another to partly or completely close the gap left by the engines which have ceased operation. The risk of separation of the jet sheets from the flap at the gap is reduced by the layer of air discharged from the nozzle 16 which is supplied by the compressors of the engines which are still in operation. Thus losses due to the discontinuities in the jet sheet are minimised.

It will be seen that as the engines intakes are connected to the common manifold 6, there will be intake suction along the whole length of the inlet 11 even when some engines are inoperative. The non-return valves 12 in the inlet ducts 7 prevent the engines which are working giving rise to reverse flow through the engines which are not working. Similarly, the non-return valves 19 in the pipes 18 prevent air being supplied from manifold 17 to the compressors of the inoperative engines. The free wheel devices 26a, etc., allow any one engine to come to rest without affecting the other three engines of the group.

In the alternative arrangement shown in Figure 6, in which those elements also appearing in Figure 5 are designated by the same reference numerals, the fuel pumps 21, 28, 29, 30 are driven by small air turbines 31, 32, 33 and 34 respectively. A small quantity of air is bled from the compressors of the engines $A_1$, $A_2$, $A_3$, $A_4$ of the inboard group and supplied to drive the turbine 31 through pipes 35a, 35b, 35c, 35d incorporating nonreturn valves 36a, 36b, 36c, 36d respectively, a common manifold 37 and a pipe 38, while the turbine 31 drives the pump 21 through a shaft 39. In the same way the turbines 32, 33 and 34 are each driven by compressed air bled from the engines of the other groups of engines. As in the case of the arrangement of Figure 5, if one pump should fail, one engine in each group will cease operation but the other engines will be unaffected.

I claim:

1. An aircraft comprising a plurality of groups of engines arranged to produce propulsive thrust on the aircraft along lines of action spaced from one another, and an engine fuel system comprising a plurality of fuel pumps, one associated with each group of engines; a common driving connection between the engines of each of said groups and the pump associated with that group; and a fuel supply connection between each one of said fuel pumps and a separate engine of each group.

2. An aircraft according to claim 1 each wherein said driving connection comprises a mechanical transmission including a plurality of free-wheel devices, one between each said engine of the group and the pump.

3. An aircraft according to claim 1 wherein each said driving connection comprises a turbine; a driving connection between the turbine and the pump; and a conduit for supplying working fluid from each engine of the group to the turbine, each conduit including a non-return valve.

4. An aircraft according to claim 1 wherein the number of engines in each group of engines is equal to the number of groups.

5. An aircraft comprising a wing; a plurality of engines arranged to produce propulsive thrust on the aircraft along parallel lines of action spaced along the wing; and an engine fuel system comprising a plurality of fuel pumps, one associated with each group of engines; a common driving connection between the engines of each of said groups and the pump associated with that group; and a fuel supply connection between each one of said fuel pumps and a separate engine of each group.

6. An aircraft comprising a wing; a plurality of groups of jet propulsion engines distributed along the wing span; means defining a plurality of rearwardly directed jet nozzles distributed along the wing span; means connecting said engines to discharge propulsive jet streams, one through each of said nozzles; and an engine fuel system comprising a plurality of fuel pumps, one associated with each group of engines; a common driving connection between the engines of each of said groups and the pump associated with that group; and a fuel supply connection between each one of said fuel pumps and a separate engine of each group.

7. An aircraft according to claim 6 wherein said nozzles are shaped and arranged so that the propulsive jet streams are discharged rearwardly as a long thin jet sheet extending spanwise of the wing.

8. An aircraft according to claim 7 comprising a jet deflector for deflecting the jet sheet downwardly from the rearward direction.

9. An aircraft according to claim 8 wherein said jet deflector is a trailing edge wing flap arranged so that the jet sheet follows a path along its upper surface.

10. An aircraft according to claim 9 wherein the wing is formed with a further long shallow nozzle extending spanwise of the wing, and comprising means to supply air to said nozzle, said further nozzle being arranged to discharge said air rearwardly as a layer between the jet sheet and the upper surface of the flap.

11. An aircraft according to claim 9 wherein the wing is formed with a further long shallow nozzle extending spanwise of the wing and each engine comprises a compressor, and further comprising a common manifold extending spanwise of the wing, means including a non-return valve connecting each compressor to supply air to said manifold, and means connecting said manifold to supply air to said further nozzle, said further nozzle being arranged to discharge said air rearwardly as a layer between the jet sheet and the upper surface of the flap.

12. An aircraft according to claim 6 wherein the wing is formed with an air inlet extending along its leading edge, and further comprising a common manifold extending spanwise of the wing, means connecting said inlet to supply air to said manifold, and means connecting said manifold to supply air to the intake of each engine.

13. An aircraft according to claim 12 wherein each said last-mentioned means includes a non-return valve.

References Cited in the file of this patent

UNITED STATES PATENTS

| | | |
|---|---|---|
| 2,162,956 | Lysholm | June 20, 1939 |
| 2,652,686 | Johnson | Sept. 22, 1953 |
| 2,677,932 | Forsling | May 11, 1954 |
| 2,723,531 | Wosika | Nov. 15, 1955 |

FOREIGN PATENTS

| | | |
|---|---|---|
| 55,382 | France | Jan. 9, 1952 |
| 200,745 | Australia | Sept. 8, 1955 |
| 720,394 | Great Britain | Dec. 22, 1954 |

OTHER REFERENCES

Serial No. 283,255, Wagner et al. (A.P.C.), published January 7, 1948.